United States Patent [19]
Politis

[11] Patent Number: 6,084,596
[45] Date of Patent: Jul. 4, 2000

[54] RENDERING SELF-OVERLAPPING OBJECTS USING A SCANLINE PROCESS

[75] Inventor: George Politis, Macquarie Fields, Australia

[73] Assignees: Canon Information Systems Research Australia Pty Ltd., Australia; Canon Kabushiki Kaisha, Japan

[21] Appl. No.: 08/522,453

[22] Filed: Aug. 31, 1995

[30] Foreign Application Priority Data

Sep. 12, 1994 [AU]  Australia ............................. PM8066

[51] Int. Cl.[7] .................................................. G06T 11/00
[52] U.S. Cl. ........................................................ 345/435
[58] Field of Search .................................. 395/133–136, 395/141, 167–170, 121, 122, 129–132

[56] References Cited

U.S. PATENT DOCUMENTS 5,428,744  6/1995  Webb et al. ...................... 395/133 X
5,493,640  2/1996  Itoh et al. ............................ 395/141

*Primary Examiner*—Almis R. Jankus
*Attorney, Agent, or Firm*—Fitzpatrick, Cella, Harper & Scinto

[57] ABSTRACT

A method of dealing with self-overlapping objects in a system for creating computerised images, which are made up of objects, by means of a scan line process is described. For each of the overlapping objects (1,2), a number of steps are performed. A first step (702) is to determine a directional border of the object (1). Another step (704) involves determining intersections of the directional border (8 to 10) with a current scan line (7). A further step is to determine, for each pixel within the scan line (7), a count of the number of preceding intersections, wherein the count is incremented for a directional border (8,9) crossing in a first direction and is decremented for a directional border crossing (10,11) in a second direction. Still, a further step (706) is to render each pixel of the object (1) a number of times equal to the count.

39 Claims, 6 Drawing Sheets

RENDERING SELF-OVERLAPPING OBJECTS USING A SCANLINE PROCESS

FIELD OF THE INVENTION

The present invention relates to the composition of computer graphic images and, in particular, the composition of objects that exhibit overlapping or "two and one half dimensional" aspects.

BACKGROUND ART

Techniques of compositing objects, which include transparency, to create a final image are well-known in the art. In a first conventional method, which derives from the "painter's algorithm", each object is normally "rendered" to create a corresponding pixel representation. The pixel representation is normally utilised in building up a final image of the objects through combining it with the representation of other objects. In order to implement transparency, a separate "alpha" channel value is often stored for each pixel of the object, indicating the object's degree of transparency. For a detailed description of combining objects having degrees of transparency, see pages 253 to 259 of an article entitled "Compositing Digital Images", SIGGRAPH 84, written by Porter and Duff, incorporated herein by reference.

An object 1 is shown in FIG. 1 that is to be rendered on top of the object 2 on a computer graphics image processing system. The object 1 is defined to be of a first colour and is partially transparent in that, after rendering, the object 2 is partially visible through the object 1. The border, or outline, of both objects 1 and 2 is defined in terms of splines in accordance with conventional techniques for defining such objects in the art.

The creation of the image of FIG. 1 using the conventional alpha channel method will now be described with reference to FIGS. 2 to 4. In FIG. 2, the currently created image consists of the previously rendered object 2. The object 2 is different from the object 2 of FIG. 1 in that it has been "scan converted", or rendered, to consist of an array of pixels rather than the format of FIG. 1 which consists of a spline outline and a representation of the internal colour of the object 2. In order to composite the object 1 shown in FIG. 3 onto the current state of the image (as defined by FIG. 2) to form the desired image shown in FIG. 4, which includes both of the objects 1 and 2, it is necessary to notionally render the object 1 into a corresponding pixel representation, with each pixel including colour and transparency information, in accordance with the Porter and Duff model, so that the corresponding pixel image of FIG. 3 can be combined with that of FIG. 2 to form the final image as shown in FIG. 4.

In order to render objects 1 or 2, which, as noted previously, are defined by a spline outline, it is normally necessary to convert the spline outlines to an approximation to the spline outline which consists of line segments rather than splines. This process of conversion is commonly known as "vectorisation". The process of vectorisation is well known to those skilled in the art. For example, two methods are described in detail at pages 487 to 488 and 511 to 514 of *Computer Graphics: Principles and Practice,* written by Foley et al., and published in 1990 by Addison-Wesley Publishing Company, incorporated herein by reference.

Referring now to FIG. 5 there is shown the result of vectorisation of the object 1 into a corresponding polygon having five sides 6 consisting of straight line segments (6A to 6E). The outline of object 1 is such that it "doubles back" on itself and the object 1 overlaps itself so that two portions of the object 1 are present in the overlapping portion 5.

If the object 1 is partially transparent, it is desirable to exhibit a 'two and one half' dimensional effect within the portion 5 so that the overlapping becomes more evident to the observer of the final image to be created. However, the foregoing conventional scan line methods are not be able to achieve this effect. They are disadvantageously unable to determine if a current object is overlapping or not.

SUMMARY OF THE INVENTION

It is an object of the present invention to provide an efficient method of rendering self overlapping objects.

In accordance with a first aspect of the present invention, there is provided a method of dealing with self overlapping objects in a system for creating computerised images made up of objects by means of a scan line process, said method comprising, for each of said overlapping objects, the steps of:

determining a directional border of said object;

determining the intersections of said directional border with a current scan line;

determining, for each pixel within a scan line a count of the number of preceding intersections wherein said count is incremented for directional border crossings in a first direction and said count is decremented for directional border crossings in a second direction; and rendering each pixel of said object a number of times equal to said count.

Preferably, when said self overlapping object is partially transparent and has associated transparency and colour information, said rendering step comprises rendering said colour information in accordance with said associated transparency information a number of times equal to said count.

BRIEF DESCRIPTION OF THE DRAWINGS

The embodiments of the present invention will now be described with reference to the accompanying drawings in which.

DETAILED DESCRIPTION

In the preferred embodiment, a direction of each side 6 of the vectorisation is determined. This direction is determined by starting at one side 6 and moving around the sides of the polygon until a circuit has been completed. Once having fully gone around the sides of the polygon, each side will have an associated direction in relation to a corresponding scan line.

The polygon can then be scan converted to a pixel format in an adaptation of the normal manner. A conventional process of scan conversion, as set out in detail in chapter 3 of Foley et al. keeps a running edge list of those edges that intersect a current "scan line" 7 (see, in particular, pages 97–99 of Foley). In the present embodiment, the edge table and active edge list are modified to also store the direction of each edge (being either up or down in y).

Figure 7:
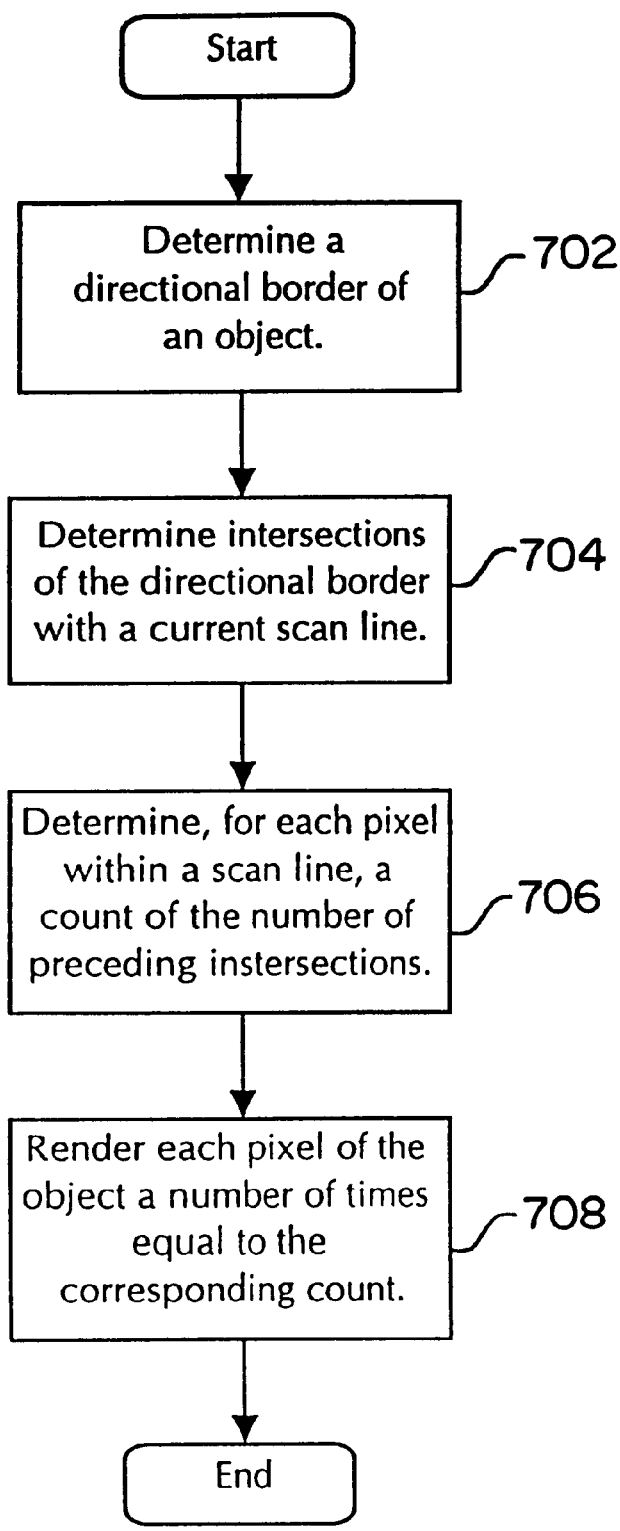
FIG. 7 is a flow diagram illustrating a method according to a further embodiment of the invention.

A flow diagram of the process of the method of dealing with self overlapping objects for use in a system for creating computerised images made up of objects by means of a scan line process is shown in FIG. 7. The method comprises the following steps performed for each of the overlapping objects.

In step 702, a directional border of the object is determined. In step 704, the intersections of the directional border with a current scan line are determined. In step 706, for each pixel within a scan line, a count of the number of preceding intersections is determined. The count is incremented for a directional border crossing in a first direction and is decremented for directional crossings in a second direction. In step 708, each pixel of the object is rendered a number of times equal to the count.

Preferably, the self overlapping object can be partially transparent and has associated transparency and colour information, and the rendering step comprises rendering the colour information in accordance with the associated transparency information a number of times equal to the count.

Figure 1:
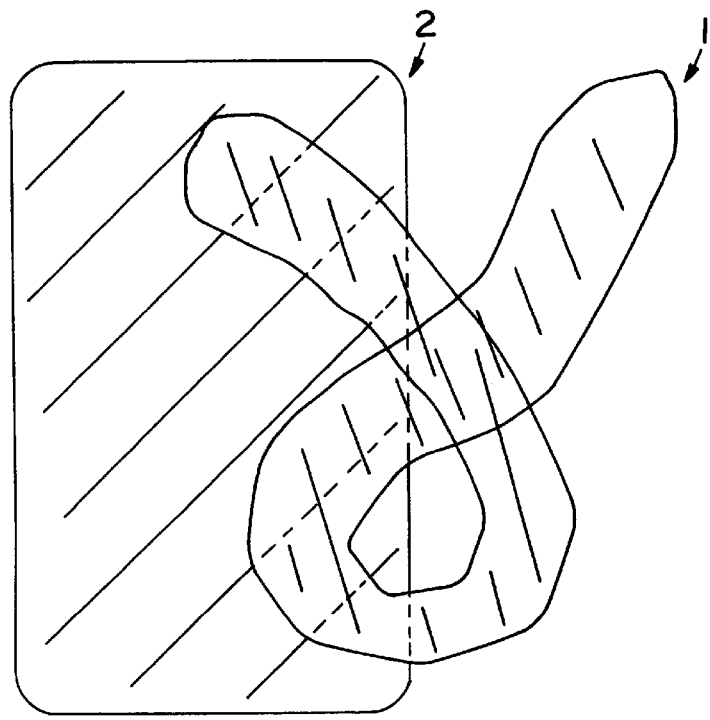
FIG. 1 illustrates two objects to be rendered.
Figure 5:
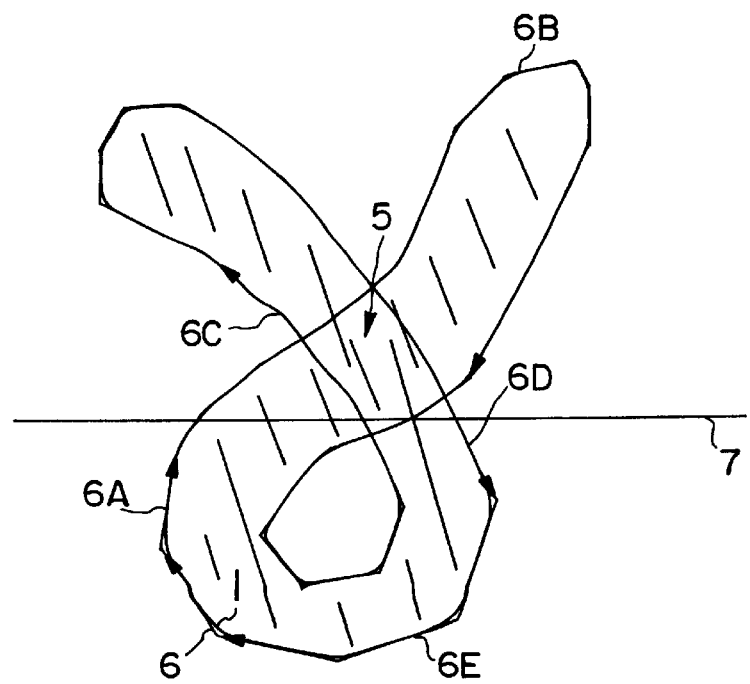
FIG. 5 illustrates the process of vectorisation and scan line rendering according to the preferred embodiment.
Figure 2:
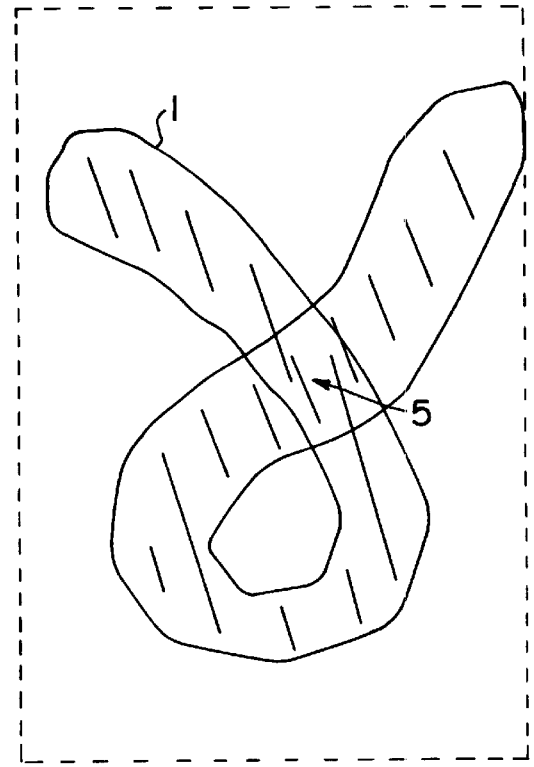
FIGS. 2 to 4 illustrate the rendering of the two objects.
Figure 3:
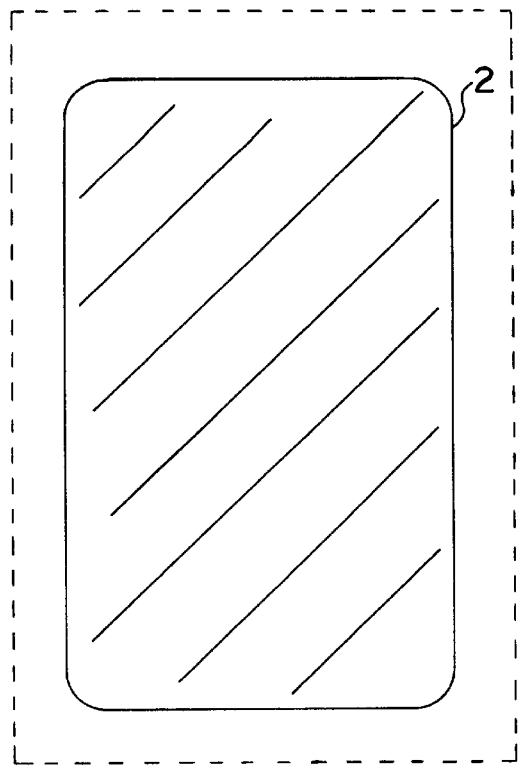
Figure 4:
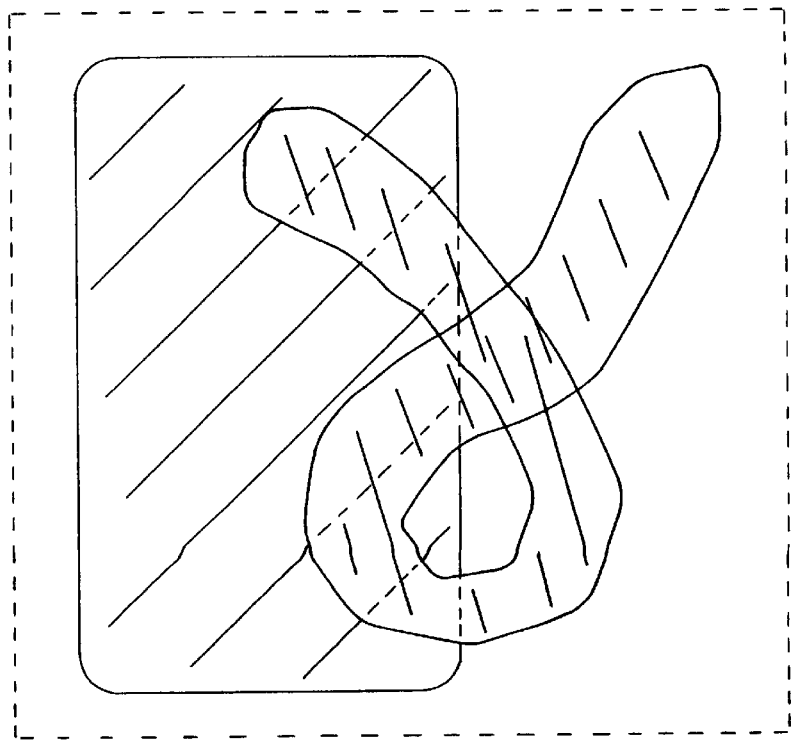

The method will now be described with reference to FIG. 6. There is shown the object 1 in phantom, with the edges intersecting the current scan line 7 of FIG. 5 shown with arrows indicating their direction. When rendering each pixel of a scan line 7, a count is kept of each edge 8 to 11 crossed. When an edge 8 and 9 in the up direction is encountered, the count is incremented. When an edge 10 and 11 in the down direction is encountered, the count is decremented. Each pixel of an object on the scan line 7 is rendered a number of times indicated by the absolute value of the current value of the count.

Figure 6:
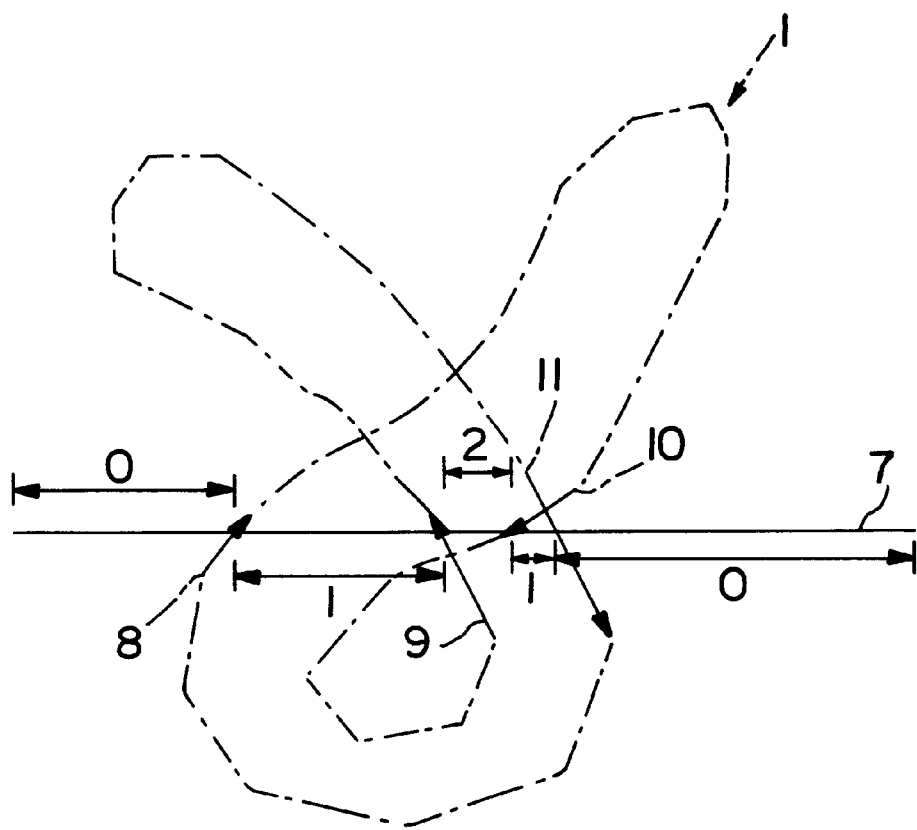
FIG. 6 illustrates the process of rendering a single scan line according to the preferred embodiment.

For the portion of the line to the edge 8 in FIG. 6, the count is zero (0) and the object 1 does not form part of these pixels. Upon encountering the "up" edge 8, the count is incremented to one (1) and the object colour, with its associated transparency, can be rendered once in accordance with a conventional technique such as the Porter and Duff method. Upon encountering the "up" edge 9 the count is again incremented (2) and the object colour is rendered twice in accordance with the conventional Porter and Duff method. The "down" edge 10 is in the opposite direction and results in a decrementing of the count (1), with the object being rendered once from edge 10 to the "down" edge 11, where another edge is encountered in the opposite direction and the count is decremented to zero (0) where it stays for the rest of the scan line.

Rendering can then proceed to the next scan line in the conventional manner, until the image rendering is completed. By utilising the absolute value of the directional edge count in determining the number of times to render object 1, the initial direction chosen to enumerate the direction of the edges 8 to 10 of a vectorisation of a spline is not of concern.

Figure 8:
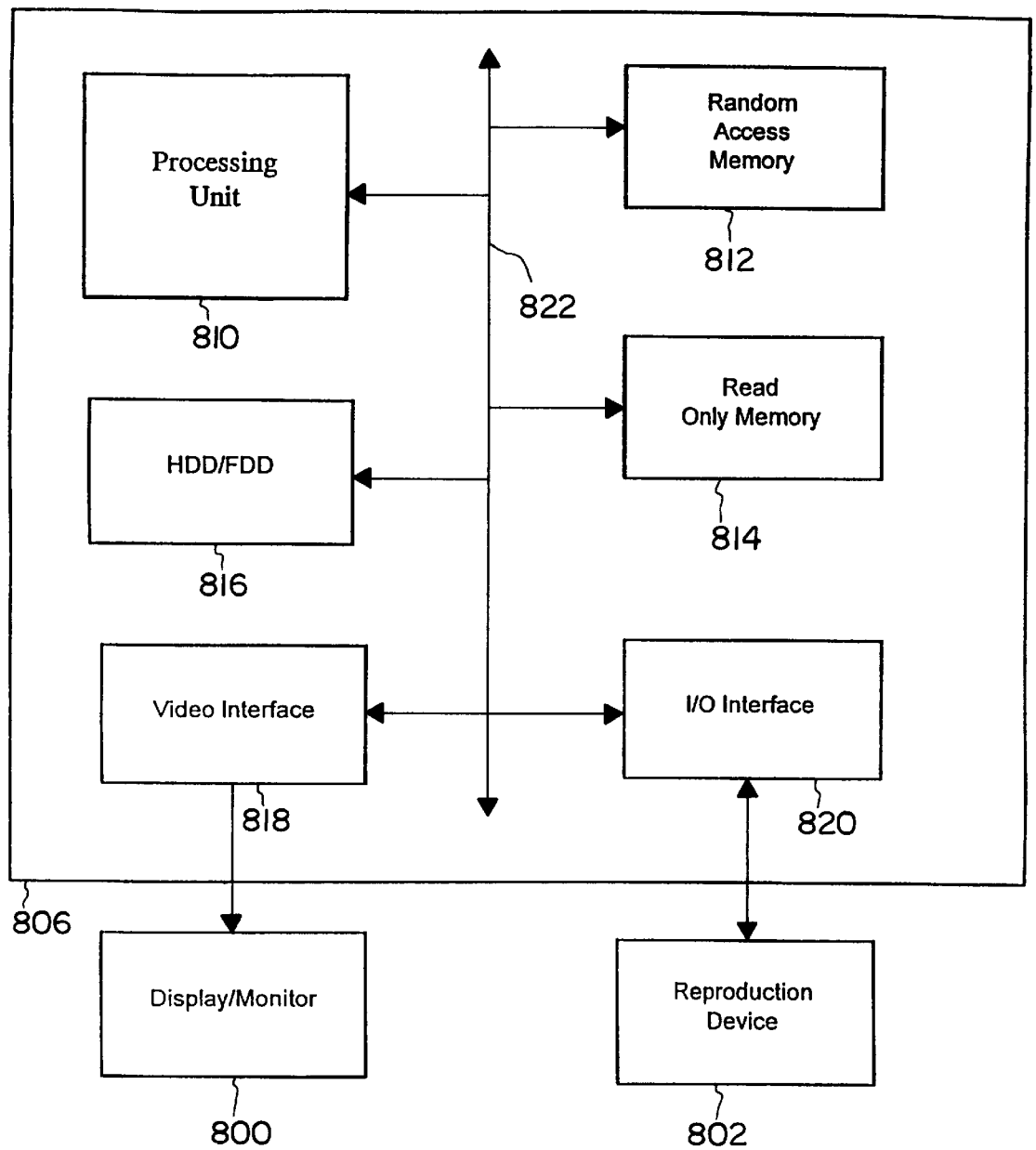
FIG. 8 is a block diagram illustrating a general purpose computer.

The process according to the preferred embodiment of the invention can be practiced as a computer-implemented method using a personal computer 806 shown in FIG. 8, for example. As is well known in the art, such a computer 806 typically comprises a central processing unit 810 coupled to a memory device for storing data and instructions to operate the central processing unit. For example, personal computers commonly include random access memory (RAM) for temporarily storing data and instructions, as well as secondary storage devices (e.g., hard drives and floppy discs) for storing data and instructions either temporarily or permanently.

As shown in FIG. 8, the processing unit 810 is coupled to a bus 822, which is well known in the art. Such a bus typically includes an address bus, data bus, control signals, and the like. In turn, random access memory 812, read only memory 814, hard disk drive/floppy disk drive 816, video interface 818, and I/O interface 820 are coupled to the bus 822. The video interface 818 provides output to display/monitor 800. Likewise, I/O interface 820 is connected to reproduction device 802. Reproduction device 802 may include laser beam printers, plotters, dot matrix printers, and the like. Accordingly, an apparatus for dealing with self-overlapping objects in a system for creating computerised images, which are made up of objects by means of a scan line process can be implemented using such a personal computer.

Figure 9:
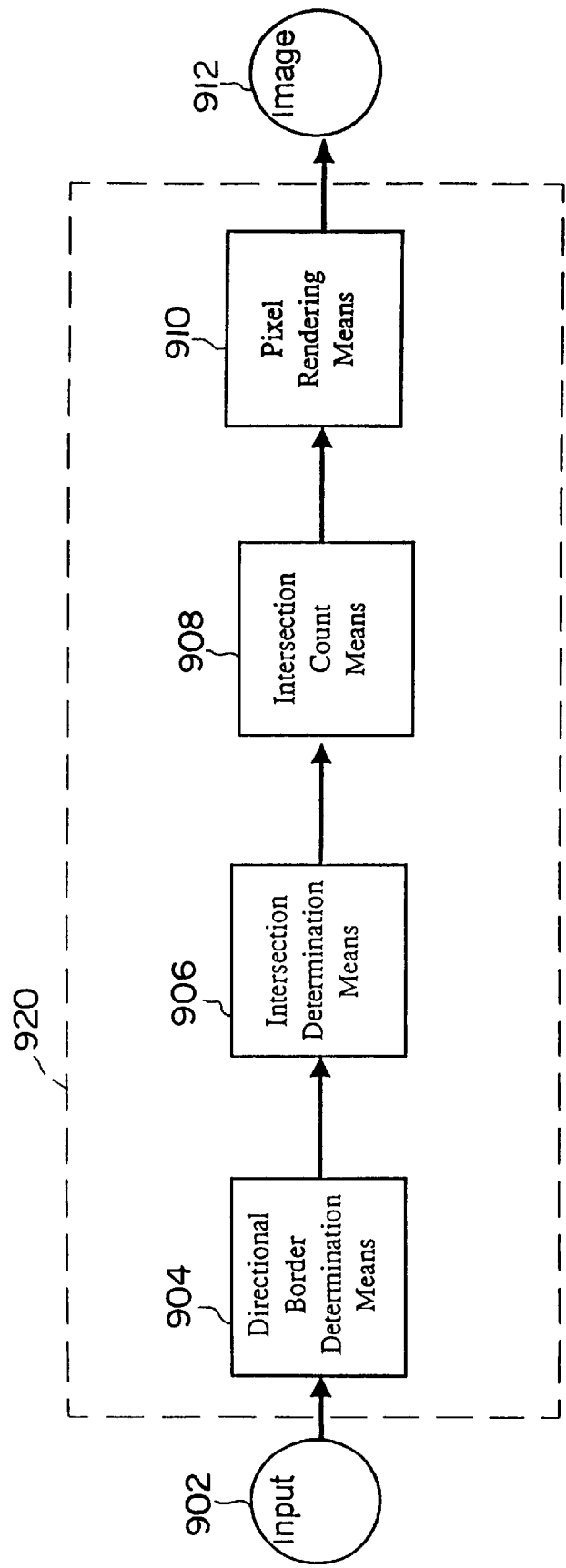
FIG. 9 is a block diagram of an apparatus according to another embodiment of the invention.

An apparatus 920 for compositing objects in an image is illustrated in FIG. 9. The apparatus 920 receives input 902 consisting of one or more objects. The apparatus 920 creates the computerised images made up of objects using a scan line process. The input 902 is provided to directional border determination means 904 for determining a directional border of an object. The output of directional border determination means 904 is provided to intersection determination means 906 for determining intersections of the directional object with a current scan line. The directional border is received from the directional border determination means. The output of intersection determination means 906 is provided to intersection count means 908. Intersection count means 908 determines, for each pixel within a scan line, a count of the number of preceding intersections, in which the count is incremented for directional border crossings in a first direction and is decremented for a directional border crossing in a second direction. For example, the count can be incremented for an "up" crossing and can be decremented for a "down" crossing. The output of intersection count means 908 is provided to pixel rendering means 910. The pixel rendering means renders each pixel of the object a number of times equal to the count. This is done for each pixel of the scan line and for all of the scan lines of an image. The output image 912 is provided at the output of pixel rendering means 910.

Further, the rendered image produced by the process and/or apparatus according to the embodiments of the invention can be provided as output to video terminal displays (or monitors) 800, reproduction devices including laser beam printers, plotters and dot matrix printers, and the like. While a number of reproduction devices have been discussed, it will be apparent to a person skilled in the art that other reproduction devices can be used without departing from the scope of the invention.

The forgoing describes only embodiments of the present invention, modifications, obvious to those skilled in the art can be made thereto without departing from the scope of the invention. For example, those skilled in the art would understand that the above system could render multiple objects simultaneously.

What is claimed is:

1. A method of rendering self-overlapping objects using a scanline process in a system for creating computerized images made up of objects, said method comprising, for each of said self-overlapping objects, the steps of:

determining a directional border of said self-overlapping object;

determining intersections of said directional border with a current scanline;

determining, for each pixel within said scanline, a count of the number of preceding intersections, wherein said count is incremented for directional border crossing in a first direction and is decremented for said directional border crossings in a second direction; and rendering each pixel of said self-overlapping object a number of times equal to said count.

2. The method according to claim 1 wherein said self-overlapping object is partially transparent and has associated transparency and color information.

3. The method according to claim 2 wherein said rendering step comprises rendering said color information in accordance with said associated transparency information said number of times equal to said count.

4. The method according to any one of claims 1 to 3 wherein said number of times is equal to an absolute value of said count.

5. The method according to any one of claims 1 to 3, further comprising the step of storing in an edge table a direction for each of a plurality of edges defining said directional border.

6. A method of compositing objects in an image, said method comprising the steps of:

converting an outline of each of the objects, wherein the outline consists of two or more splines, to produce a border, wherein the border consists of a plurality of edges;

defining a directional border for each of the objects, wherein a direction is stored for each edge of the plurality of edges; and rendering the image wherein the following steps are performed for each pixel of a scanline:

incrementing a count if the pixel intersects an edge having a first direction, or decrementing the count if the pixel intersects an edge having a second direction; and rendering color information of the pixel in response to an absolute value of the count.

7. The method according to claim 6, wherein a self-overlapping object is partially transparent and has associated transparency and color information.

8. The method according to claim 7, wherein the color information is rendered in accordance with the associated transparency information a number of times equal to the count.

9. The method according to claim 6, wherein said direction for each edge defining the directional border is stored in an edge table.

10. An apparatus for rendering self-overlapping objects using a scan line process to create computerized images which are made up of objects, said apparatus comprising:

means for determining a directional border of a self-overlapping object;

means for determining intersections of said directional border with a current scan line, wherein said directional border is received from said means for determining a directional border;

means for determining, for each pixel within said scan line, a count of the number of preceding intersections, wherein said count is incremented for directional border crossings in a first direction and is decremented for said directional border crossings in a second direction; and means for rendering each pixel of said self-overlapping object a number of times equal to said count.

11. The apparatus according to claim 10, wherein each object is partially transparent and has associated transparency and color information.

12. The apparatus according to claim 11, wherein the color information is rendered in accordance with the associated transparency information a number of times equal to the count.

13. The apparatus according to claim 10, further comprising an edge table for storing the direction for each edge defining the directional border.

14. An apparatus for compositing objects in an image, said apparatus comprising:

means for converting an outline of each of the objects, wherein the outline consists of two or more splines, to produce a border, wherein the border consists of a plurality of edges;

means for defining a directional border for each of the objects, wherein a direction is stored for each edge of the plurality of edges; and means for rendering the image, said rendering means comprising the following, which operate on each pixel of a scanline:

means for incrementing a count if the pixel intersects an edge having a first direction, or decrementing the count if the pixel intersects an edge having a second direction; and means for rendering color information of the pixel in response to an absolute value of the count.

15. The apparatus according to claim 13, wherein the color information of the pixel is rendered a number of times equal to the absolute value of the count.

16. The apparatus according to claim 13, wherein each object is partially transparent and has associated transparency and color information.

17. The apparatus according to claim 15, wherein the color information is rendered in accordance with the associated transparency information a number of times equal to the count.

18. The apparatus according to claim 13, further comprising an edge table for storing the direction for each edge defining the directional border.

19. A method of rendering self-overlapping objects using a scanline process in a system for creating computerized images having at least one object, said method comprising, for each of the objects, the steps of:

determining a directional border of the object;

determining intersections of the directional border with a current scanline;

determining a count for each pixel within the scanline, based on the direction of the directional border on the determined intersections, wherein if the pixel is:

a part of an image outside the object, the pixel has a first count, a part of the image within the object, the pixel has a second count, or a part of the image within a self-overlapping portion of the object, the pixel has a third count; and rendering each pixel of the object a number of times equal to the count determined for each pixel.

20. The method according to claim 18, wherein the object is partially transparent and has associated transparency and color information.

21. The method according to claim 19, wherein the color information is rendered in accordance with the associated transparency information a number of times equal to the count.

22. The method according to claim 18, wherein the direction for each edge defining the directional border is stored in an edge table.

23. An apparatus for rendering self-overlapping objects using a scanline process in a system for creating computerized images having at lease one object, said apparatus comprising:

means for determining a directional border with a current scanline;

means for determining intersections of the directional border with a current scanline;

means for determining a count for each pixel within the scanline, based on the direction of the directional border on the determined intersections, wherein if the pixel is:

a part of an image outside the object, the pixel has a first count, a part of the image within the object, the pixel has a second count, or a part of the image within a self-overlapping portion of the object, the pixel has third count; and means for rendering each pixel of the object a number of times equal to the count determined for each pixel.

24. The apparatus according to claim 22, wherein each object is partially transparent and has associated transparency and color information.

25. The apparatus according to claim 23, wherein the color information is rendered in accordance with the associated transparency information a number of times equal to the count.

26. The apparatus according to claim 22, further comprising an edge table for storing the direction for each edge defining the directional border.

27. A computer program product comprising a computer readable medium having computer program instructions recorded therein for rendering self-overlapping objects using a scanline process to create computerized images which are made up of objects, said computer program product comprising:

instructions for determining a directional border of a self-overlapping object;

instructions for determining intersections of the directional border with a current scan line;

instructions for determining, for each pixel within the scanline, a count of the number of preceding intersections, wherein the count is incremented for directional border crossings in a first direction and is decremented for directional border crossings in a second direction; and instructions for rendering each pixel of the self-overlapping object a number of times equal to the count.

28. The computer program product according to claim 27, wherein the self-overlapping object is partially transparent and has associated transparency and color information.

29. The computer program product according to claim 28, wherein the color information is rendered in accordance with the associated transparency information a number of times equal to the count.

30. The computer program product according to claim 27, further comprising instructions for storing the direction for each edge defining the directional border in an edge table.

31. An computer program product comprising a computer readable medium having computer program instructions recorded thereon for compositing objects in an image, said computer program product comprising:

instructions for converting an outline of each of the objects, wherein the outline consists of two or more splines, to produce a border, wherein the border consists of a plurality of edges;

instructions for defining a directional border for each of the objects, wherein a direction is stored for each edge of the plurality of edges; and instructions for rendering the image, said rendering instructions comprising the following instructions, which operate on each pixel of a scanline:

instructions for incrementing a count if the pixel intersects an edge having a first direction, or decrementing the count if the pixel intersects an edge having a second direction, and instructions for rendering color information of the pixel in response to an absolute value of the count.

32. The computer program product according to claim 31, wherein the color information of the pixel is rendered a number of times equal to the absolute value of the count.

33. The computer program product according to claim 31, wherein each object is partially transparent and has associated transparency and color information.

34. The computer program product according to claim 33, wherein the color information is rendered in accordance with the associated transparency information a number of times equal to the count.

35. The computer program product according to claim 31, further comprising instructions for storing the direction for each edge defining the directional border in an edge table.

36. A computer program product comprising a computer readable medium having computer program instructions recorded therein for rendering self-overlapping objects using a scanline process for creating computerized images having at least one object, said computer product comprising:

instructions for determining a directional border of a the object;

instructions for determining intersections of the directional border with a current scanline;

instructions for determining a count for each pixel within the scanline, based on the direction of the directional border on the determined intersections, wherein if the pixel is:

a part of an image outside the object, the pixel has a first count, a part of the image within the object, the pixel has a second count, or a part of the image within a self-overlapping portion of the object, the pixel has a third count; and instructions for rendering each pixel of the object a number of times equal to the count determined for each pixel.

37. The computer program product according to claim 36, wherein each object is partially transparent and has associated transparency and color information.

38. The computer program product according to claim 37, wherein the color information is rendered in accordance with the associated transparency information a number of times equal to said count.

39. The computer program product according to claim 36, further comprising instructions for storing the direction for each edge defining the directional border in an edge table.

\* \* \* \* \*